Feb. 9, 1943.  C. E. BRANICK  2,310,892

VALVE

Filed Feb. 21, 1941

Inventor
CHARLES E. BRANICK

By *Howard Fisher*
Attorney

Patented Feb. 9, 1943

2,310,892

UNITED STATES PATENT OFFICE 2,310,892

VALVE

Charles E. Branick, Fargo, N. Dak.

Application February 21, 1941, Serial No. 379,934

3 Claims. (Cl. 277—42)

My invention relates to an improvement in a three-way valve which is designed to exhaust rapidly and which may be operated virtually an innumerable number of times without causing trouble in the operation by undue wear and thus leaking so as not to operate properly.

It is a feature of the construction of my valve to overcome the necessity of a stuffing box and nut around the valve stem which is ordinarily employed in three-way valves, and thus I overcome the undesirable features inherent to such stuffing box constructions. Where a stuffing nut is used in a valve, the same must be adjusted from time to time to keep the packing tight around the valve stem, and I have found where a three-way valve is desired to be used in a place where the operation is either continuous or for a good many operations, this old construction is impractical.

While packless valves have been made, they are ordinarily expensive and operate in the form where flat polished discs are caused to bear against each other. If a high pressure is used, these valves are hard to operate on account of the friction between the discs.

In my valve I have designed the same to operate freely and easily and to require little or no attention as far as keeping the joints tight, and this is due to the peculiar construction of my valve which has self adjusting packing means within the same so as to always keep the joints tight in the operation of the valve.

While my valve employs packing, such packing is a composition in the form of a washer-like member made of a rubber composition and of a construction which is to be found in almost any garage service station, so that should the washer packing wear sufficiently to be replaced, the valve can be readily repaired.

It is also a feature of my valve to provide means which operates automatically to turn the valve into neutral position after the operating lever of the same has been released, if the operator forgets to turn it into neutral position. Thus when my valve is used connected to any machines to be operated by air, or in a similar manner, the operator cannot forget and leave the valve in operating position, but rather, as soon as the valve is released from operating position, it is automatically forced into neutral position so that there is no danger of the air pressure operating the machine unless the valve operating lever is held into position to direct the pressure to the machine to which the valve is connected.

A further feature of my valve is that the operating lever may be moved into position to hold the exhaust valve open after the valve has been operated to complete any operation of the machine to which the valve is connected, thereby providing a safety feature in this exhaust valve arrangement. The operating lever, however, must first be moved from operating position into neutral position.

A further feature of my valve is that the body of the same may be made solid or integral and the packings are contained and housed within the valve. I employ spring means within the valve associated with each of the elements operating against the packing so as to maintain an automatic adjustment between the operating parts and the packing, thereby providing an automatic take-up which insures a leak-proof joint.

In the drawing forming a part of my specification:

Figure 1:
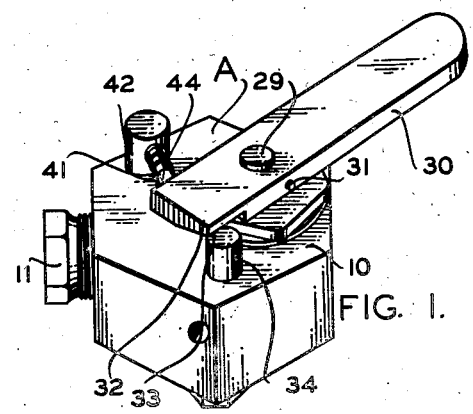
Figure 1 is a perspective view of my valve.

My valve A is made with an integral body portion 10, and in the construction shown, this body portion is of a hexagonal nature. I provide an inlet connection 11 for air or other suitable source of pressure which may be connected to an air compressor or any means of pressure to be regulated by the valve A to operate machines such as tire spreaders or other devices which require pressure for operating the same. Such machines are not shown in the drawing. The air inlet connection 11 is provided with a passageway 12 extending through the same. This connection is screwed into the body 10 as indicated.

Within the passageway receiving the connection 11, I provide a valve 13 which is normally caused to bear against the rubber-like washer gasket 14 positioned in the bottom of the passageway 15 wherein the valve 13 is located. The coil spring 16 holds the head of the valve 13 normally in contact with the washer 14, thereby keeping the passageway from the valve closed.

Figure 5:
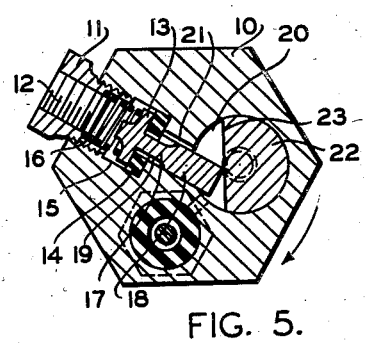
Figure 5 is a section on the line 5—5 of Figure 4.

The valve 13 is provided with a reduced stem portion 17 and a cylindrical bearing end portion 18 which operates in the cylindrical passageway 19 leading from beneath the head of the valve 13 and connecting with the chamber 20. A groove 21 forming an air passageway extending alongside of the bearing portion 18 of the valve 13 is formed in the body 10 of the valve so that when the valve 13 is released by lifting the same from its washer seat 14 against the tension of the spring 16, air pressure coming in through the intake passage 12 is permitted to pass the valve 13 through the groove passageway 21 and into the chamber 20. The chamber 20 is formed in the body of the valve 10 and extends at virtually right angles to the inlet passageway 12. The chamber 20 is adapted to receive a rotating operating cam 22. The operating cam 22 has a working cam such as 23 as illustrated in Figure 5 which is adapted to bear against the end 18 of the valve 13 so as to operate the valve 13 when the operating cam 22 is rotated in the direction of the arrow in Figure 5 against the end 18. When the operating cam 22 is rotated in the manner which is just set forth, the valve 13 may be opened to admit air pressure into the chamber 20, through the passageway 36 and out of the passageway 45 to the machine to which the valve A is connected.

The operating cam 22 is normally held against the rubber washer-like packing member 24 held within a recess formed in the locking nut 25 by the coil spring 26. The coil spring 26 is seated on one end in the socket 27 formed in the body 10 of the valve, while the other end of the spring bears against the bottom face of the valve 22. By this means the operating cam 22 is held to bear automatically and normally against the sealing washer 24.

It is apparent when air pressure is introduced into the chamber 20, this pressure will also cause the operating cam 22 to bear against the sealing washer 24. The packing washer 24 as well as the washer 14 is made of a composition of rubber or other suitable material so as to provide a long wearing packing which may be treated with graphite or other lubricating material which has a tendency to overcome excess friction. These packing washers 14 and 24 being formed of a rubber composition or material which is compressible and yet having a tough long wearing nature, provide a sealing means in my valve of a very desirable nature because it permits the valve to be operated easily and with little or no wear on the packing washers even under a very heavy use. The packing washer 24 is held in place by the annular recess 28 formed in the stem 29 of the operating cam 22.

The lock nut 25 is threaded into the body 10 and is locked tightly against a sealing gasket 25' so as to hold the operating cam 22 in the chamber 20 and to seal the chamber tightly around the nut 25. The washer 24 seals the operating stem 29 against any leakage about the stem.

The operating cam 22 is adapted to be operated by the lever 30 which is keyed to the stem 29 by the pin 31. Thus when the lever 30 is operated by hand or otherwise, the operating cam 22 will be rotated as heretofore set forth in the direction of the arrow, so as to open the valve 13. The valve 13 may be closed by the action of the spring 16 with the aid of the air pressure against the head of the valve when the operating cam 22 is moved by the lever 30 in a direction reverse to the arrow in Figure 5. The lever 30 is formed with a cam operating end 32 having a bevelled cam surface 33 formed on the under side thereof which engages against the outer stem 34 of the exhaust valve 35 to open the valve 35 and permit any air pressure in the machine to be exhausted out through the passageway 45, around the valve head 35, through the passageway 37 in the washer packing 38, past the reduced portion 39 of the stem 34, and out of the exhaust port 40, of the body 10.

Figure 2:
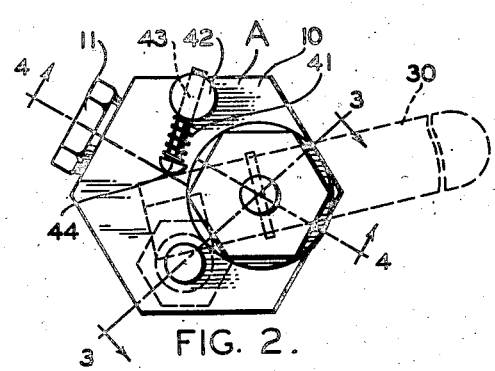
Figure 2 is a side elevation of the same.
Figure 3:
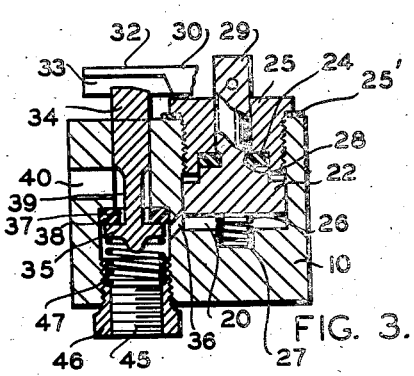
Figure 3 is a section on the line 3—3 of Figure 2.
Figure 4:
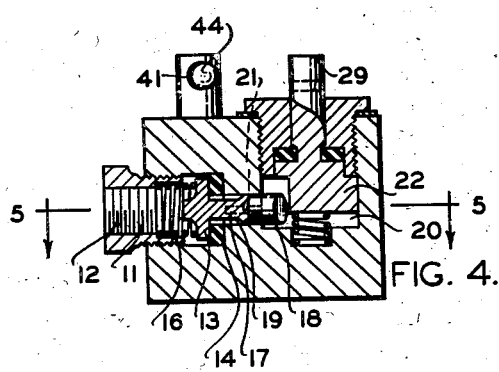
Figure 4 is a section on the line 4—4 of Figure 2.

The lever 30 is adapted to be manually operated to be moved into position to operate the exhaust valve 35. The coil spring 41 is carried by an operating rod 43 which is formed with an operating head 44. The head 44 normally engages the cam end of the lever 30 as illustrated in Figure 1, and in dotted outline in Figure 2, so that the spring 41 bears against this end of the lever 30 and tends to move the lever into neutral position to release the working cam 22 and permit the valve 13 to close when the lever 30 is in neutral position.

The valve A is provided with an air outlet or pressure working passageway 45 in which the threaded coupling 46 is positioned and which is threaded to the body 10 of the valve A. The coupling 46 is adapted to hold a coil spring 47 against the head of the valve 35 to normally hold the exhaust valve 35 against the packing washer 38 to close the exhaust port. When the exhaust valve 35 is in closed position and air pressure is introduced into the chamber 20 and from there through the passageway 36 and out through the passageway 45, the pressure operates the machine to which it is connected. The air pressure in the chamber 20 while operating a machine to which the valve is connected, also acts with the spring 26 to tighten the seal (gasket 24) around the stem 29, maintaining whatever pressure is allowed to enter into the machine to which the valve is connected, as well as preventing any leakage of the pressure in the valve around the stem 29. Thus when the passageway 45 is connected to a machine to be operated by air pressure or other pressure, such pressure may be used to operate any kind of machine, such as a tire spreader, or any other type of a machine where pressure is used to operate and control the same. The packing washer 38 is formed of the same material as the packing washers 14 and 24. Thus when air or other pressure is admitted into the valve A, the pressure in the valve automatically aids in sealing the valve against leaks which ordinarily occur in old types of valves around the operating stems of the valves or the valve stems which operate the valves. In this manner I provide a means of utilizing the pressure in my valve A for automatically aiding in sealing the valve against leaks. Furthermore, the sealing washers 14, 24 and 38 may be of the same size and character, making it more convenient for the replacement of the same.

It will be apparent that the valve 35 is normally held closed by the spring 47 and that the packing means for sealing the valve is of the same character as the other packing washers, all of which washers, namely 14, 24 and 38 are housed within the body 10 of the valve A and which are soft and pliable enough so that the springs 16, 26 and 47 automatically hold the working parts sealed and automatically compensate for any wear. These springs are not necessarily of a strong nature, but are simply of a sufficient strength to keep the valves 13 and 35 and the working cam 22 operating with sealed joints to the outer atmosphere, and still freely operable so as to provide a three-way valve of a very desirable nature.

The operating lever 30 with its cam operating end 32, permits almost instantaneous exhaust to be acquired when the lever 30 is moved beyond neutral position which may be desirable in such types of machines as spreaders for tires and other machines when quick exhaust is required.

I have placed my three-way valve A under severe tests to determine whether or not the same would be practical for long and continuous operation without attention or adjustment to keep the same tight and to operate easily and efficiently. These tests have shown this valve to be very practical and economical to make and requiring little or no attention, even though the valves are subjected to innumerable operations.

In accordance with the patent statutes, I have described the construction and operation of my three-way valve, and while I have endeavored to set forth the best embodiments thereof, I desire to have it understood that these are only illustrative of a means of carrying out my invention, and that obvious changes may be made within the scope of the following claims without departing from the spirit of the invention.

I claim:

1. A three-way control valve including an inlet and an outlet passage, a horizontally extending valve for closing said inlet passage, a sealing gasket for said valve, spring means for normally holding said valve closed, a cam for opening said inlet valve, a stem leading from said cam to the outside of said control valve, a horizontal lever connected to said stem, a gasket around said stem to provide a sealing joint thereabout, spring means for holding said cam against said sealing means about said stem, an exhaust opening, a vertically extending valve for normally closing said exhaust opening, a sealing gasket for said exhaust valve, spring means for holding said exhaust valve against said sealing means, and cam means provided on the end of said horizontal lever for causing said exhaust valve to be opened when said first named cam releases said inlet valve to closed position.

2. A three-way control valve comprising a body formed of one piece, inlet and outlet openings in said body, a horizontal extending operating lever, a controlling cam within said body, an inlet valve horizontally positioned within said inlet opening, said cam operated by said lever, said inlet valve operated by said cam upon the movement of said lever in one direction, a vertical extending exhaust valve positioned within said outlet opening, said operating lever having a cam surface at one end thereof, and said cam surface engaging said exhaust valve to open the same upon movement of said handle in the opposite direction.

3. A three-way control including an inlet and an outlet passage, said inlet and outlet passages being positioned at substantially right angles to each other, a horizontal extending valve for closing said inlet passage, a cam, a horizontal extending operating lever, said cam operated by said lever upon the movement of said lever in one direction, said cam engaging said horizontal extending valve to open the same, spring means for normally closing said inlet valve, a vertical extending valve for closing said outlet passage, an exhaust passage connected to said outlet passage, a spring for normally closing said vertical extending valve to close said exhaust passage, said outlet valve having a vertical extending stem, said operating lever having a cam surface at one end thereof, said cam surface engaging said vertical extending stem to open said exhaust valve upon the movement of said lever in the opposite direction, and spring means for automatically operating said lever to close said inlet valve.

CHARLES E. BRANICK.